(12) United States Patent
Kang

(10) Patent No.: US 10,275,052 B2
(45) Date of Patent: Apr. 30, 2019

(54) JOG DIAL FOR ELECTRONIC DEVICE AND ELECTRONIC DEVICE PROVIDED WITH SAME

(71) Applicant: Samsung Electronics Co., Ltd., Suwon-si (KR)

(72) Inventor: Hee-jun Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 15/527,641

(22) PCT Filed: Jul. 22, 2015

(86) PCT No.: PCT/KR2015/007613
§ 371 (c)(1),
(2) Date: May 17, 2017

(87) PCT Pub. No.: WO2016/088969
PCT Pub. Date: Jun. 9, 2016

(65) Prior Publication Data
US 2017/0344133 A1    Nov. 30, 2017

(30) Foreign Application Priority Data
Dec. 5, 2014    (KR) .......................... 10-2014-0174186

(51) Int. Cl.
G06F 3/0362    (2013.01)
G06F 3/02    (2006.01)
(Continued)

(52) U.S. Cl.
CPC ............. *G06F 3/0362* (2013.01); *G05G 1/08* (2013.01); *G06F 3/02* (2013.01); *H01H 3/0213* (2013.01); *H01H 3/08* (2013.01); *H01H 19/14* (2013.01)

(58) Field of Classification Search
CPC .......... G05G 1/08; H01H 3/0213; H01H 3/08; H01H 19/14
See application file for complete search history.

(56) References Cited

U.S. PATENT DOCUMENTS 8,179,697 B2    5/2012    Kim et al.
8,666,523 B2    3/2014    Kim et al.
(Continued)

FOREIGN PATENT DOCUMENTS

EP    2 487 884 A1    8/2012
EP    2 733 579 A2    5/2014
(Continued)

OTHER PUBLICATIONS

International Search Report. PCT/ISA/210, dated Nov. 19, 2015 in corresponding International Application No. PCT/KR2015/007613.
(Continued)

*Primary Examiner* — Carolyn R Edwards
(74) *Attorney, Agent, or Firm* — Staas & Halsey LLP

(57) ABSTRACT

A jog dial according to the present invention can be used in an electronic device. The jog dial according to the present invention comprises: a dial knob rotatably provided on an upper surface of an operation panel of the electronic device; an object provided on the dial knob; and a detector provided below the operation panel, and detecting the object so as to output a signal, wherein the dial knob and the detector are separated from each other.

10 Claims, 19 Drawing Sheets

(51) Int. Cl.
*G05G 1/08* (2006.01)
*H01H 3/02* (2006.01)
*H01H 3/08* (2006.01)
*H01H 19/14* (2006.01)

(56) References Cited

U.S. PATENT DOCUMENTS

| | | | |
|---|---|---|---|
| 2006/0042921 A1* | 3/2006 | Saitoh | H03K 17/968 200/302.2 |
| 2008/0224996 A1* | 9/2008 | Arihara | G06F 3/0362 345/157 |
| 2008/0238879 A1 | 10/2008 | Jaeger et al. | |
| 2008/0259056 A1* | 10/2008 | Freier | G05D 23/1393 345/184 |
| 2009/0000413 A1* | 1/2009 | Furhoff | B60K 37/06 74/473.3 |
| 2010/0052938 A1 | 3/2010 | Otsuka et al. | |
| 2010/0127162 A1 | 5/2010 | Lum et al. | |
| 2012/0158297 A1 | 6/2012 | Kim et al. | |
| 2013/0088097 A1 | 4/2013 | Kim | |
| 2014/0139486 A1* | 5/2014 | Mistry | G06F 3/0304 345/175 |

FOREIGN PATENT DOCUMENTS

| | | |
|---|---|---|
| JP | 2008-193676 | 8/2008 |
| JP | 2013-236348 | 11/2013 |
| JP | 2013236348 A * | 11/2013 |
| KR | 10-2010-0010047 | 1/2010 |
| KR | 10-2010-0083508 | 7/2010 |
| KR | 10-2011-0060681 | 6/2011 |
| KR | 10-2011-0122656 | 11/2011 |
| KR | 10-2012-0069267 | 6/2012 |
| KR | 10-2013-0043910 | 5/2013 |
| KR | 10-2013-0100881 | 9/2013 |
| KR | 10-2014-0005484 | 1/2014 |
| WO | WO 2008/137301 A1 | 11/2008 |

OTHER PUBLICATIONS

Written Opinion of the International Searching Authority, PCT/ISA/237, dated Nov. 19, 2015 in corresponding International Application No. PCT/KR2015/007613.
European Partial Supplementary European Search Report dated Sep. 5, 2017, in corresponding European Patent Application No. 15865265.1.
Extended European Search Report dated Jan. 18, 2018, in corresponding European Patent Application No. 15865265.1.

* cited by examiner

200

JOG DIAL FOR ELECTRONIC DEVICE AND ELECTRONIC DEVICE PROVIDED WITH SAME

CROSS-REFERENCE TO RELATED APPLICATIONS

This application is a U.S. National Stage Application, which claims the benefit under 35 U.S.C. § 371 of PCT International Patent Application No. PCT/KR2015/007613, Jul. 22, 2015, which claims the foreign priority benefit under 35 U.S.C. § 119 of Korean Patent Application No. 10-2014-0174186, filed Dec. 5, 2014, the contents of which are incorporated herein by reference.

TECHNICAL FIELD

The present disclosure relates to a jog dial used in electronic device. More particularly, the present disclosure relates to a jog dial for an electronic device having a structure in which a rotary dial and a detector for detecting a position of the rotary dial are separated from each other, and an electronic device provided with the same.

BACKGROUND ART

Electronic devices such as a washing machine use a jog dial to allow a user to select a desired course from various work courses that the electronic device can perform.

An example of a conventional jog dial used in the electronic devices is illustrated in FIG. 1.

Referring to FIG. 1, the conventional jog dial 1 includes a dial knob 3 and a potential meter 5. The potential meter 5 is provided on a circuit board 6 for controlling an electronic device, and the circuit board 6 is disposed below an operation panel 9 provided in a case of the electronic device. Therefore, the potential meter 5 is located below the operation panel 9. Also, a rotating shaft 7 coupled with the dial knob 3 is provided at the center of the potential meter 5. The rotating shaft 7 of the potential meter 5 passes through the operation panel 9 of the electronic device and protrudes upward. The dial knob 3 is coupled to the rotating shaft 7 of the potential meter 5 above the operation panel 9 of the electronic device. Accordingly, when the user turns the dial knob 3, the rotating shaft 7 coupled to the dial knob 3 is rotated. When the rotating shaft 7 rotates, a value output from the potential meter 5 changes. A controller of the circuit board 6 may recognize a position of the dial knob 3 by receiving the value output from the potential meter 5. Accordingly, if the values output from the potential meter 5 are matched with various work courses that can be performed by the electronic device, the user may select a desired work course by rotating the dial knob 3.

However, since the conventional jog dial 1 is provided with the dial knob 3 and the potential meter 5 which are mechanically coupled to each other, when the jog dial 1 is aged, the dial knob 3 may not rotate smoothly, or the connection portion between the dial knob 3 and the rotating shaft 7 may be broken.

In addition, when the potential meter 5 is aged, there is a problem that the potential meter 5 may be damaged or a recognition error may occur.

Also, since the operation panel 9 of the electronic device is provided with a through hole 8 through which the rotating shaft 7 of the potential meter 5 passes, there is a problem that the circuit board 6 may be damaged by moisture that enters into the inside of the operation panel 9 through the through hole 8.

In addition, since the conventional jog dial 1 has a structure in which the dial knob 3 and the rotating shaft 7 of the potential meter 5 are mechanically coupled to each other, there is a design limitation that the dial knob 3 must have a certain height or more for the coupling of the dial knob 3 and the rotating shaft 7. Accordingly, there is a problem that the conventional jog dial 1 itself becomes a restriction factor in the design of the electronic device.

DISCLOSURE

Technical Problem

The present disclosure has been developed in order to overcome the above drawbacks and other problems associated with the conventional arrangement, and relates to a jog dial that can minimize a failure due to mechanical coupling and prevent moisture penetration because a dial knob and a detector for detecting the positions of the dial knob are separated from each other without being mechanically connected, and an electronic device having the same.

Technical Solution

According to an aspect of the present disclosure, a jog dial for an electronic device used in an electronic device with an operation panel may include a dial knob rotatably disposed in an upper surface of the operation panel; a body to be detected provided with the dial knob; and a detector disposed below the operation panel and configured to identify the body to be detected and output a signal, wherein the dial knob and the detector are separated from each other.

The body to be detected may include a permanent magnet, and the detector may include a geomagnetic sensor.

The geomagnetic sensor may be disposed below a rotation center of the dial knob, and the permanent magnet may be disposed at a position eccentric from the rotation center of the dial knob.

The body to be detected may include a plurality of near field communication (NFC) tags, and the detector may include an NFC reader.

The plurality of NFC reader may be provided in the dial knob in a circular shape centered on a rotation center of the dial knob, and the NFC reader may be provided to read one NFC tag among the plurality of NFC tags.

The operation panel may be provided with a rotation protrusion, and the dial knob is provided with a rotation groove into which the rotation protrusion is inserted, wherein when the rotation protrusion of the operation panel is inserted into the rotation groove of the dial knob, the dial knob is rotatable with respect to the operation panel.

The operation pastel may be provided with a rotation groove, and a lower surface of the dial knob may be provided with a rotation protrusion which is inserted into the rotation groove, wherein when the rotation protrusion of the dial knob is inserted into the rotation groove of the operation panel, the dial knob is rotatable with respect to the operation panel.

The operation panel may be provided with a dial groove into which the dial knob is inserted, and the dial knob may be rotatably disposed in the dial groove.

The dial knob may be formed in a ring shape, and the operation panel may be provided with an annular groove into which the dial knob of the ring shape is inserted, wherein the dial knob of the ring shape is rotatably disposed in the annular groove.

A display may be provided in a central portion of the annular groove of the operation panel.

The dial knob may be formed in a ring shape, and a circular support portion which is inserted into the dial knob of the ring shape may protrude from the operation panel, wherein the dial knob of the ring shape is rotatably supported by the circular support portion.

A display may be provided in the circular support portion of the operation panel.

According to another aspect of the present disclosure, an electronic device may include a case to the electronic device; an operation panel provided in the case; a dial knob rotatably disposed in a upper surface of the operation panel; a body to be detected disposed in the dial knob; a circuit board disposed below the operation panel and provided with a detector that identifies the body to be detected and outputs a signal; and a controller disposed in the circuit board, and configured to control the electronic device using the signal of the detector, wherein the dial knob and the detector are separated from each other and the operation panel is interposed between the dial knob and the detector.

The controller may include a lookup table defining positions of the body to be detected and operations of the electronic device.

The body to be detected may include a permanent magnet or a plurality of NFC tags, and the detector may include a geomagnetic sensor or an NFC reader.

The geomagnetic sensor may be disposed below a rotation center of the dial knob, and the permanent magnet may be disposed at a position eccentric from the rotation center of the dial knob.

The plurality of NFC reader may be provided in the dial knob in a circular shape centered on a rotation center of the dial knob, and the NFC reader may be provided to communicate with one NFC tag among the plurality of NFC tags.

The electronic device may include a washing machine and a microwave oven.

DESCRIPTION OF DRAWINGS

FIG. 2c is an exploded perspective view illustrating the jog dial of FIG. 2a;

FIG. 8c is a rear perspective view illustrating a dial knob of the jog dial of FIG. 8a;

BEST MODE

Hereinafter, certain exemplary embodiments of a jog dial for an electronic device and an electronic device with the same according to the present disclosure will be described in detail with reference to the accompanying drawings.

It is to be understood that the embodiments described below are provided for illustrative purpose only, and that the present disclosure may be embodied with various modifications different form exemplary embodiments described herein. However, in the following description below, detailed description of well-known functions or components will be omitted when it may be unnecessary to obscure the subject matter of the present disclosure. Further, the accompanying drawings may be not drawn to scale in order to facilitate understanding of the disclosure, but the dimensions of some of the components may be exaggerated.

Figure 2A:
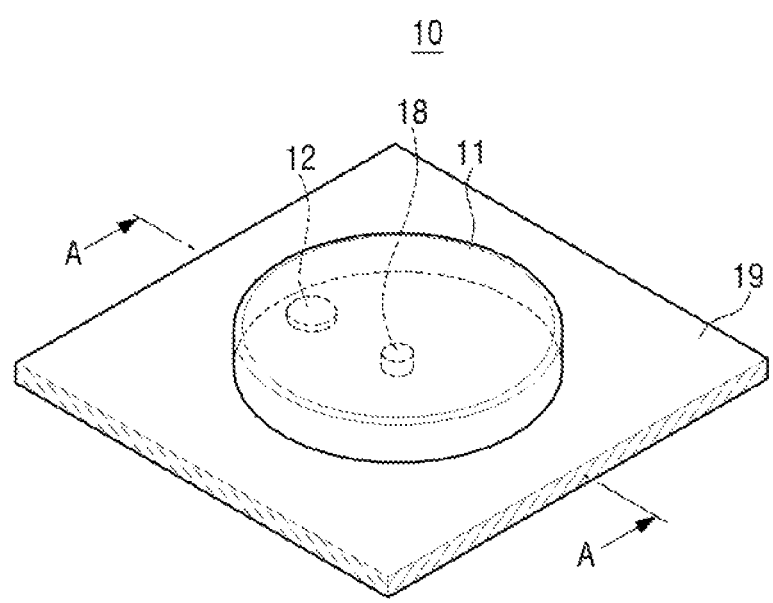
FIG. 2a is a perspective view illustrating a jog dial tor an electronic device according to an embodiment of the present disclosure.
Figure 2B:
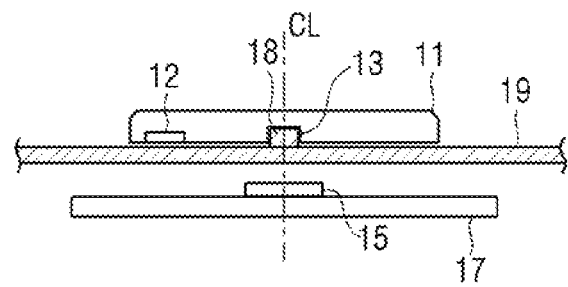
FIG. 2b is a cross-sectional view illustrating the jog dial of FIG. 2a taken along a line A-A.
Figure 2C:
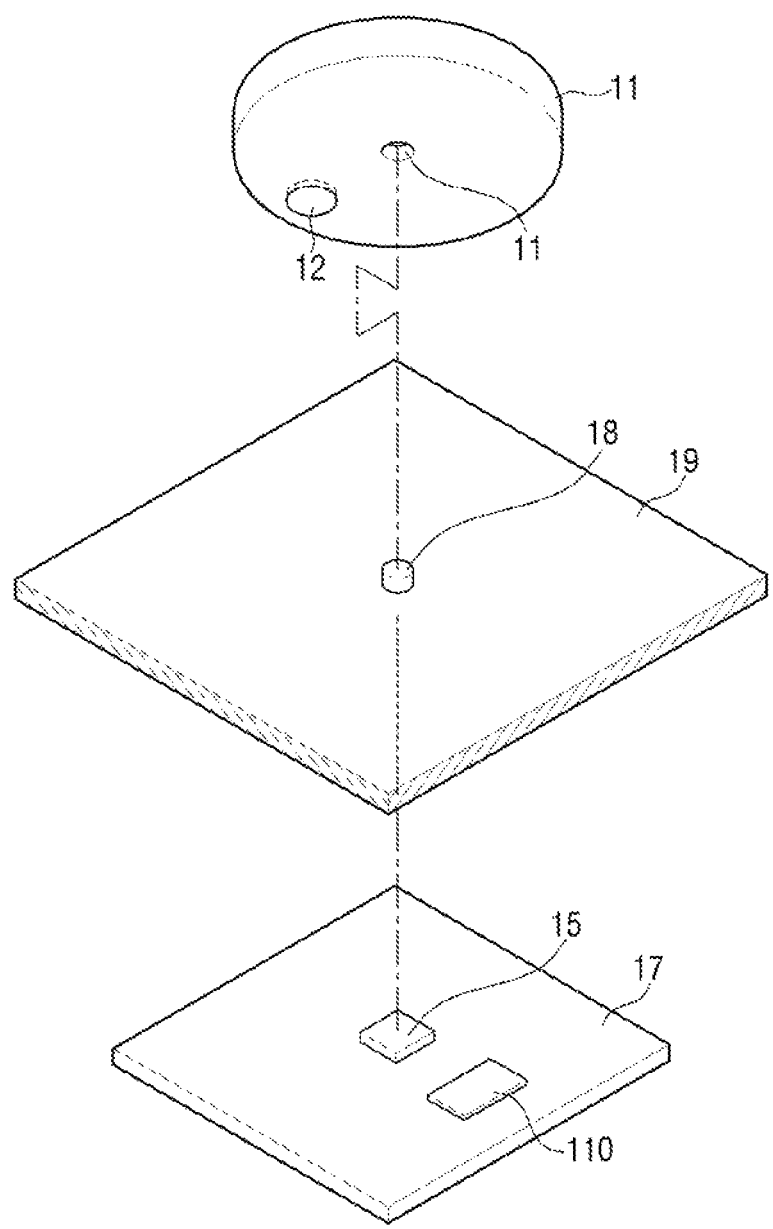

FIG. 2a is a perspective view illustrating a jog dial for an electronic device according to an embodiment of the present disclosure, and FIG. 2b is a cross-sectional view illustrating the jog dial of FIG. 2a taken along a line A-A. FIG. 2c is an exploded perspective view illustrating the jog dial of FIG. 2a.

A case of an electronic device in which a jog dial according to the present disclosure is disposed is provided with an operation panel on which the jog dial may be disposed. The operation panel of the electronic device may be provided with various buttons, switches, a display, and the like in addition to the jog dial so that a user may control the electronic device using the operation panel. The jog dial according to the present disclosure may be used in electronic devices such as a washing machine, a microwave oven, and the like.

Referring to FIGS. 2a to 2c, a jog dial 10 for an electronic device according to an embodiment of the present disclosure may include a dial knob 11 and a detector 15.

The dial knob 11 is a substantially disc shape, and is rotatably disposed on the upper surface of the operation panel 19 of the electronic device. In detail, a rotation protrusion 18 is formed on the upper surface of the operation panel 19 of the electronic device, and a rotation groove 13 into which the rotation protrusion 18 of the operation panel 19 may be inserted is formed in the lower surface of the dial knob 11. The rotation profusion 18 of the operation panel 19 and the rotation groove 13 of the dial knob 11 are formed such that the dial knob 11 is free to rotate with respect to the rotation protrusion 18 and does not come off from the rotation protrusion 18. Further, the dial knob 11 is formed to maintain its position when the applied force is removed. Accordingly, when the rotation protrusion 18 of the operation panel 19 is inserted into the rotation groove 13 of the dial knob 11, the dial knob 11 may stably freely rotate above the operation panel 19.

The dial knob 11 is provided with a body to be detected 12 for allowing the detector 15 to recognize the position of the dial knob 31. The body to be detected 12 is disposed so that the position of the body to be detected 12 changes as the dial knob 11 rotates. The body to be detected 12 may be provided on the upper surface of the dial knob 11. However, it is preferable that the body to be detected 12 is provided on the lower surface of the dial knob 11 so that the detector 15 provided under the operation panel 19 can easily detect the body to be detected 12. Various types of the body to be detected 12 may be used depending on the type of the detector 15. For example, when a geomagnetic sensor is used as the detector 15, a permanent magnet may be used as the body to be detected 12. Alternatively, in the case where a near field communication (NFC) reader is used as the detector 15, an NFC tag may be used as the body to be detected 32.

The body to be detected 12 is provided at a position eccentric from the center of the rotation of the dial knob 11. Accordingly, when the dial knob 31 is rotated, the position of the body to be detected 12 changes, and the detector 15 recognizes the position of the body to be detected 12 at this time and outputs a signal corresponding to the position of the body to be detected 12.

Figure 1:
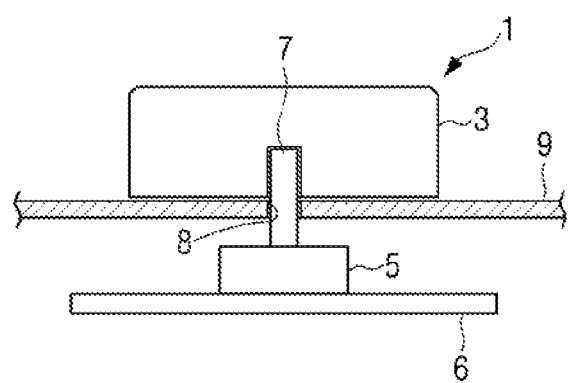
FIG. 1 is a cross-sectional view illustrating an example of a conventional jog dial.

The detector 15 detects the body to be detected 12 and outputs a signal. The detector 15 is provided below the operation panel 19 of the case of the electronic device. In detail, the detector 15 may be disposed on a circuit board 17 provided below the operation panel 19 and may not be exposed to the outside. As illustrated in FIG. 2b, is the jog dial 10 according to an embodiment of the present disclosure, the detector 15 and the dial knob 11 are not mechanically coupled to each other. In other words, the detector 15 is disposed at a predetermined distance away from the dial knob 11. That is, the detector 15 are not mechanically connected to and are separated from the dial knob 11. Accordingly, no force is applied to the detector 15 even when the dial knob 13 rotates. Also, in the jog dial 10 according to an embodiment of the present disclosure, since the dial knob 11 and the detector 15 are not mechanically connected to each other, it is not necessary to form a through hole in the operation panel 19 to connect the dial knob 11 and the detector 15 provided in the upper surface and the lower surface of the operation panel 19. Therefore, it does not occur that the outside moisture penetrates into the inside of the operation panel 9 (see FIG. 1) through the through hole 8 (see FIG. 1) of the operation panel 9 so as to damage the circuit board 17 as in the prior art. Here, the circuit board 17 may include a controller for controlling the operation of the electronic device, and may be composed of a central processing unit (CPU), a memory, and various electronic components constituting an electronic circuit.

FIGS. 2a, 2b, and 2c show a case where the body to be detected 12 disposed on the dial knob 11 is a permanent magnet and the detector 15 provided on the circuit board 17 is a geomagnetic sensor.

The geomagnetic sensor used as the detector 15 outputs information on the north direction by detecting geomagnetic field, and is widely used in smartphones and the like. In the present disclosure, the geomagnetic sensor 15 detects the magnetic field of the permanent magnet 12 and outputs information about the position of the permanent magnet 12. Accordingly, when the position of the permanent magnet 12 is changed by rotating the dial knob 11, the value output from the geomagnetic sensor 15 changes. A controller, which is electrically connected to the geomagnetic sensor 15, may identify the position of the permanent magnet 12 by reading the output value.

To this end, the geomagnetic sensor 15 is disposed below the rotation center of the dial knob 11. That is, the geomagnetic sensor 15 is disposed so that the center line CL passing through the rotation center of the dial knob 11 passes through the center of the geomagnetic sensor 15. Therefore, when the dial knob 11 provided with the permanent magnet 12 eccentrically about the rotation center of the dial knob 11 rotates, the geomagnetic sensor 15 may detect and output the position of the permanent magnet 12 which changes along the locus of the circle around the center line CL.

Since the dial knob 11 and the detector 35 of the jog dial 10 according to the present disclosure are not mechanically connected to each other, the dial knob 11 may be formed in various shapes. Hereinafter, various examples of the dial knob used in the jog dial 10 according to an embodiment of the present disclosure will be described in detail with reference to FIGS. 3 to 7b.

Figure 3:
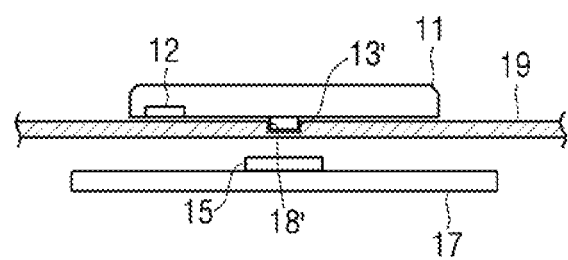
FIG. 3 is a cross-sectional view illustrating a jog dial for an electronic device according to an embodiment of the present disclosure provided with a dial knob according to another example.

Although FIGS. 2a to 2c illustrate the case where the rotation groove 13 is formed in the lower surface of the dial knob 11, and the rotation protrusion 18 is formed in the operation panel 19 of the electronic device, the reverse may be also possible. That is, as illustrated in FIG. 3, a rotation protrusion 131 is formed on the lower surface of the dial knob 11, and a rotation groove 18' into which the rotation protrusion 13' is inserted is formed on the operation panel 19 of the electronic device. In such a case, since the rotation groove 18' is formed in the operation panel 19, there is an advantage that the thickness of the dial knob 11 may be made thinner than the dial knob 11 according to the above-described embodiment.

Figure 4A:
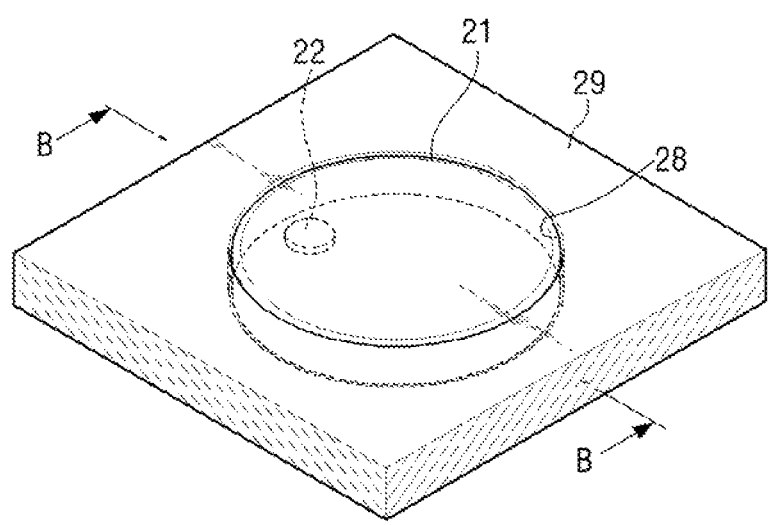
FIG. 4a is a perspective view illustrating a jog dial for an electronic device according to an embodiment of the present disclosure provided with a dial knob according to another example.
Figure 4B:
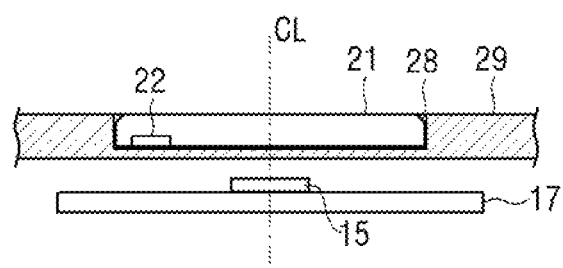
FIG. 4b is across-sectional view illustrating the jog dial of FIG. 4a taken along a line B-B.

FIGS. 4a and 4b illustrate the case where the dial knob is embedded in the operation panel 19 of the electronic device.

Referring to FIGS. 4a and 4b, an operation panel 29 of an electronic device is provided with a dial groove 28 corresponding to the shape and size of a dial knob 21 into which a dial knob 21 is inserted. The dial groove 28 is formed such that the dial knob 21 is inserted and freely rotatable. Therefore, the dial knob 21 provided in the dial groove 28 may be freely rotated with respect to the dial groove 28 when the user rotates the dial knob 21 by applying a force to the dial knob 21. When the user does not apply a force to the dial knob 21, the dial knob 21 may maintain the current position.

At this time, the permanent magnet 12 of the body to be detected is disposed on the lower surface of the dial knob 21 in the same manner as in the above-described embodiment, and the geomagnetic sensor 15 as a detector for detecting the permanent magnet 12 as disposed on the circuit board 17 below the operation panel 29. The geomagnetic sensor 15 is disposed so that the center of the geomagnetic sensor 15 coincides with the rotation center of the dial knob 21. That is, the center of the geomagnetic sensor 15 and the rotation center of the dial knob 21 are located on the same center line CL.

On the other hand, FIG. 4*b* illustrates a case where no rotation protrusion is provided on either the dial knob 21 or the operation panel 29. As another example, the lower surface of the dial knob 21 may be provided with a rotation protrusion as illustrated in FIG. 2*b* or a rotation groove as illustrated in FIG. 3. At this time, the dial groove 28 of the operation panel 29 into which the dial knob 21 is inserted may be provided with a rotation groove corresponding to the rotation protrusion of the dial knob 21 or a rotation protrusion corresponding to the rotation groove of the dial knob 21.

Figure 5A:
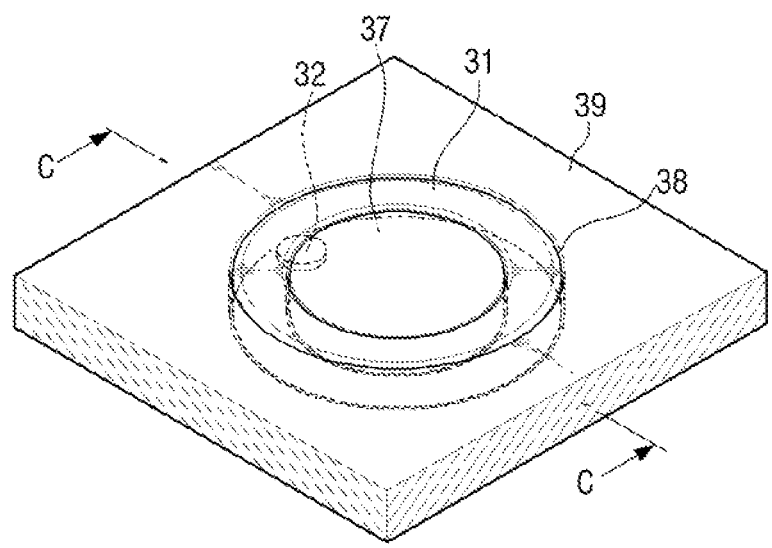
FIG. 5a is a perspective view illustrating a jog dial for an electronic device according to an embodiment of the present disclosure provided with a dial knob according to another example.
Figure 5B:
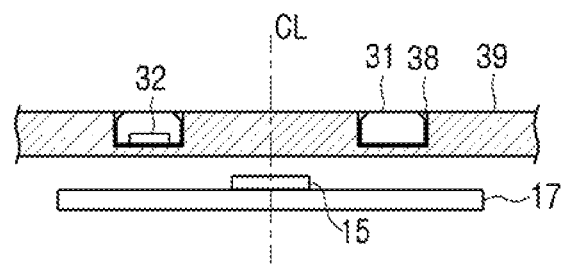
FIG. 5b is a cross-sectional view illustrating the jog dial of FIG. 5a taken along a line C-C.

FIGS. 5*a* and 5*b* show a case where a dial knob is formed in a ring shape and is embedded in an operation panel of the electronic device.

Figure 6:
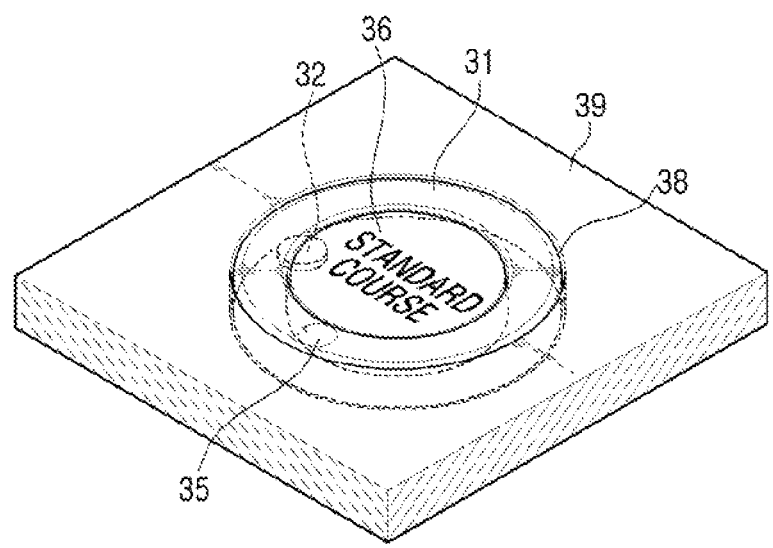
FIG. 6 is a plan view illustrating a jog dial for an electronic device according to an embodiment of the present disclosure.

Referring to FIGS. 5*a* and 5*b*, a dial knob 31 is formed in a ring (annulus) shape. A permanent magnet 32 of the body to be detected may be disposed on the lower surface of the dial knob 31 of the ring shape. An operation panel 39 of the electronic device is provided with an annular groove 38 into which the dial knob 31 of the ring shape is inserted. The annular groove 38 is formed such that the dial knob 31 of the ring shape is inserted and freely rotatable. Accordingly, the dial knob 31 of the ring shape provided in the annular groove 38 may be freely rotated with respect to the annular groove 38 when the user rotates the dial knob 31 by applying a force to the dial knob 31. What the user does not apply a force to the dial knob 31, the dial knob 31 may maintain the current position. In addition, the upper surface of the dial knob 31 may be provided with a contact groove 35 having a concave shape, which may be contacted with the user's fingertip, so that the user can rotate the dial knob 31 easily. One example of such a contact groove 35 is illustrated in FIG. 6.

On the other hand, the geomagnetic sensor 15 as a detector for detecting the permanent magnet 32 of the body to be detected 12 is disposed on the circuit board 17 provided below the operation panel 39 in the same manner as in the above-described embodiment. Also, the geomagnetic sensor 15 is disposed so that the center of the geomagnetic sensor 15 coincides with the rotation center of the dial knob 31 of the ring shape. That is, the center of the geomagnetic sensor 15 and the rotation center of the dial knob 31 are located on the same center line CL.

As a variation, a display 36 may be provided in a central portion 37 of the annular groove 38 of the operation panel 39 of the electronic device. A case in which the display 36 is provided in the central portion 37 of the annular groove 38 is illustrated in FIG. 6. At this time, the display 36 may display a description of the operation selected by the rotation of the dial knob 31. For example, in the case in which the jog dial 10 according to the present disclosure is applied to a washing machine 100 (see FIG. 9), when the user rotates the dial knob 31 of the jog dial 10 to select a standard course, the display 36 may be configured to display a description of the standard course as illustrated in FIG. 6. Although not illustrated in FIG. 6, the display 36 may display a detailed description of the standard course. A flat panel display such as an LCD, an OLED, and the like may be used as the display 36.

Figure 7A:
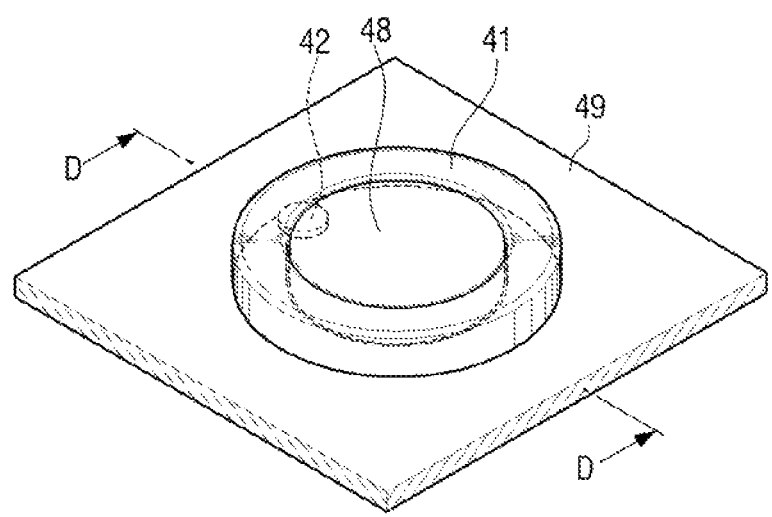
FIG. 7a is a perspective view illustrating a jog dial for an electronic device according to an embodiment of the present disclosure provided with a dial knob according to another example.
Figure 7B:
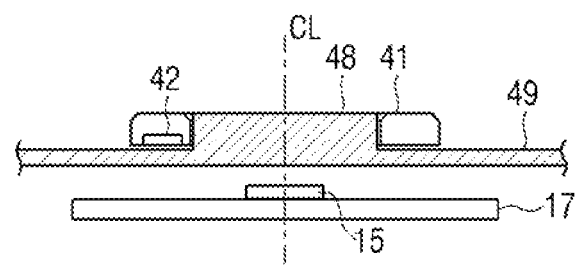
FIG. 7b is a cross-sectional view illustrating the jog dial of FIG. 7a taken along a line D-D.

FIGS. 7*a* and 7*b* illustrate a case in which a dial knob is formed in a ring (annular) shape, and protruded from an operation panel of the electronic device.

Referring to FIGS. 7*a* and 7*b*, a dial knob 41 is formed in a ring (annulus) shape. A permanent magnet 42 of the body to be detected may be disposed on the lower surface of the dial knob 41 of the ring shape. An operation panel 49 of the electronic device is provided with a circular support portion 48 which is inserted into the dial knob 41 of the ring shape. The circular support portion 48 is formed in a cylindrical shape protruding from the operation panel 49, and the protruding height thereof may be formed to be substantially equal to the thickness of the dial knob 41. Further, the circular support portion 48 is formed so that the dial knob 41 of the ring shape is inserted and freely rotatable. Accordingly, the dial knob 41 of the ring shape provided in the circular support portion 48 of the operation panel 49 may be freely rotated with respect to the circular support portion 48 when the user rotates the dial knob 41 by applying a force to the dial knob 41. When the user does not apply a force to the dial knob 41, the dial knob 41 may maintain the current position.

Although not illustrated, the circular support portion 48 may be provided with a display is the same manner as the embodiment of the dial knob 31 illustrated in FIG. 6. At this time, the display may display a description of the operation selected by the rotation of the dial knob 41 as in the above-described embodiment.

Hereinafter, as another example of a jog dial according to the present disclosure, a jog dial in which an NFC reader (near field communication reader) is used as a detector and an NFC tag (near field communication tag) is used as a body to be detected will be described in detail with reference to FIGS. 8*a* to 8*c*.

Figure 8A:
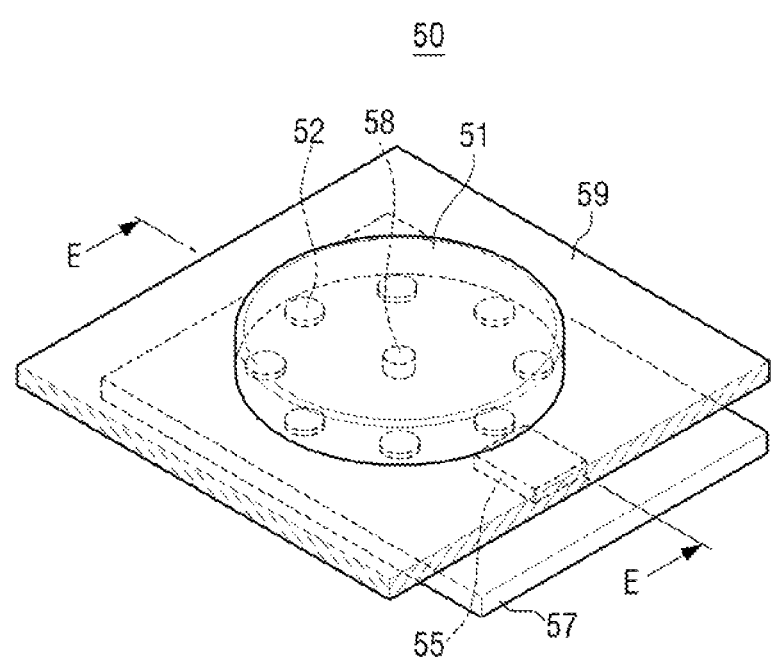
FIG. 8a is a plan view illustrating a jog dial for an electronic device according to another embodiment of the present disclosure.
Figure 8B:
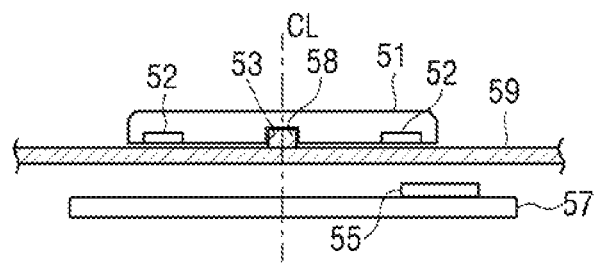
FIG. 8b is a cross-sectional view illustrating the jog dial of FIG. 8a taken along a line E-E.

FIG. 8*a* is a plan view illustrating a jog dial for an electronic device according to another embodiment of the present disclosure, and FIG. 8*b* is a cross-sectional view illustrating the jog dial of FIG. 8*a* taken along a line E-E. FIG. 8*c* is a rear perspective view illustrating a dial knob of the jog dial of FIG. 8*a*.

Figure 8C:
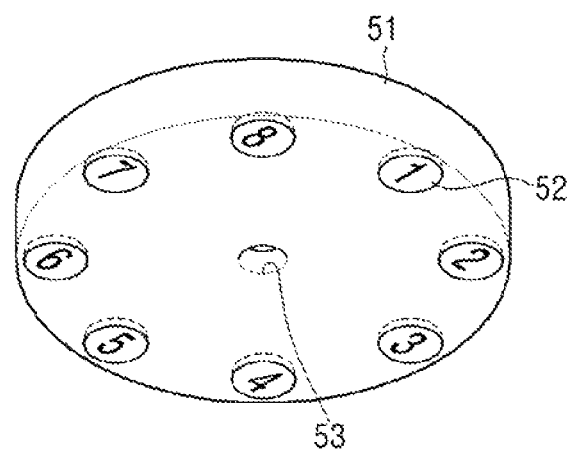

Referring to FIGS. 8*a* to 8*c*, a jog dial 50 according to an embodiment of the present disclosure may include a dial knob 51 and an NFC reader 55.

The dial knob 51 is rotatably disposed on the upper surface of the operation panel 59 of the electronic device. In detail, a rotation protrusion 58 is formed on the upper surface of the operation panel 59 of the electronic device, and a rotation groove 53 into which the rotation protrusion 58 of the operation panel 59 is inserted is formed on the lower surface of the dial knob 51. The rotation protrusion 58 of the operation panel 59 and the rotation groove 53 of the dial knob 51 are formed such that the dial knob 51 is freely rotatable with respect to the rotation protrusion 58 and does not come off from the rotation protrusion 58. Further, the dial knob 51 is formed to maintain its position when the applied force is removed. Accordingly, when the rotation protrusion 58 of the operation panel 59 is inserted into the rotation groove 53 of the dial knob 51, the dial knob 51 may be stably freely rotated above the operation panel 59.

A plurality of NFC tags 52 is provided on the lower surface of the dial knob 51. The plurality of NFC tags 52 is arranged to form one circle centered on the rotation center of the dial knob 53. The plurality of NFC tags 52 may be formed to have different codes, respectively. For example, when eight NFC tags 52 are used, NFC tags 52 having codes of 1 to 8 are arranged in order on the lower surface of the dial knob 53 as illustrated in FIG. 8*c*.

As another example, the plurality of NFC tags 52 may be formed by sequentially arranging NFC tags 52 having two different codes. For example, when eight NFC tags 52 are used, four NFC tags 52 having a code of 1 and four NFC tags 52 having a code of 2 are arranged as 1-2-1-2-1-2-1-2 on the lower surface of the dial knob 51.

The NFC reader 55 serving as a detector of the NFC tag 52 is provided on a circuit board 57 disposed below the operation panel 59 to be able to communicate with and recognize the NFC tags 52 disposed on the lower surface of the dial knob 51. The NFC reader 55 may include an NFC antenna (not illustrated) to communicate with the NFC tags 52 and to read information recorded in the NFC tags 52. The NFC reader 55 is disposed to read only one NFC tag 52 among the plurality of NFC tags 52 provided on the dial knob 51 as illustrated in FIG. 8a. Thus, the NFC reader 55 is disposed not to be mechanically coupled to the dial knob 51. In other words, because the NFC reader 55 is disposed at a certain distance apart from and not in contact with the dial knob 51, the NFC reader 55 and the dial knob 51 are not mechanically connected to, but are separated from each other.

The NFC reader 55 communicates with the NFC tag 52 located directly above the NFC reader 55 among the plurality of NFC tags 52 attached to the dial knob 51, reads the value stored in the corresponding NFC tag 52, and outputs the value. Then, the controller 110 connected to the NFC reader 55 may recognize the current position of the dial knob 51 based on the output value of the NFC reader 55.

In the case of the jog dial 50 according to the present embodiment in which the NFC reader 55 and the NFC tags 52 are used as the detector and the body to be detected, the shape of the dial knob 51 may be formed in various shapes like the above-described jog dial 10 using the geomagnetic sensor 15. That is, the dial knob 51 of the jog dial 50 according to the present embodiment stay be formed is the shapes as illustrated in FIGS. 3 to 7b. However, it is different that instead of the permanent magnet 12, the plurality of NFC tags 52 is provided on the lower surface of the dial knob 51 and the NFC reader 55 is disposed just below one NFC tag 52 of the plurality of NFC tags 52 provided on the dial knob 51 instead of the rotation center of the dial knob 51.

Hereinafter, a washing machine to which a jog dial according to an embodiment of the present disclosure is applied will be described in detail with reference to FIGS. 9 to 11.

Figure 9:
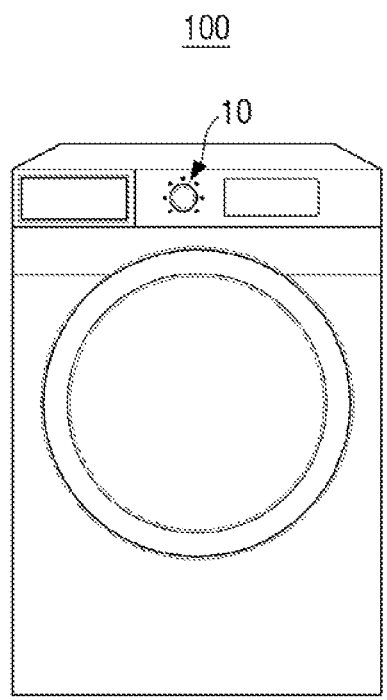
FIG. 9 is a view illustrating a washing machine to which a jog dial for an electronic device according to an embodiment of the present disclosure is applied.
Figure 10:
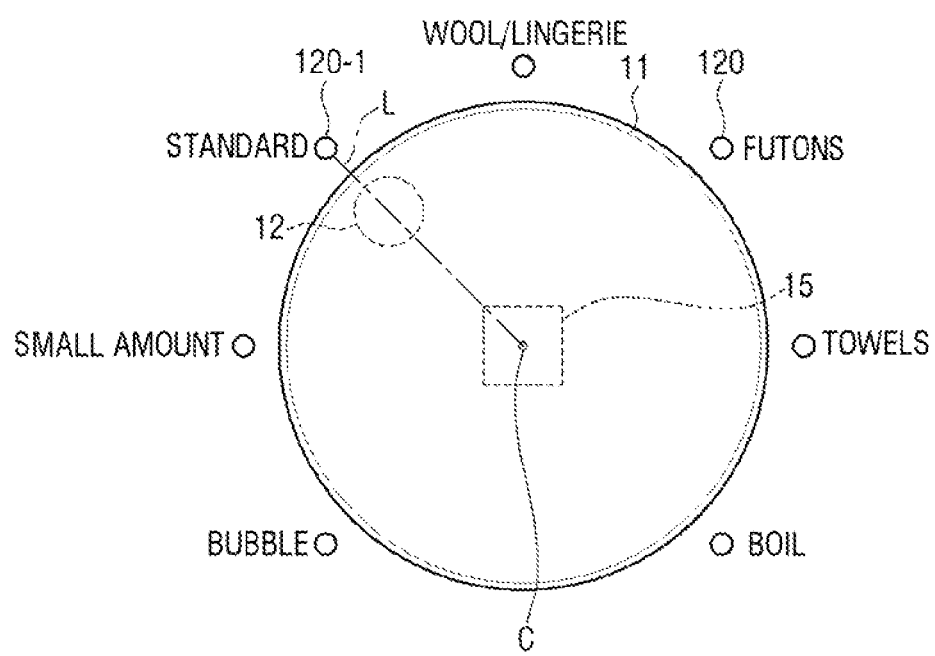
FIG. 10 is an enlarged view illustrating a portion of the washing machine of FIG. 9 where the jog dial is disposed.
Figure 11:
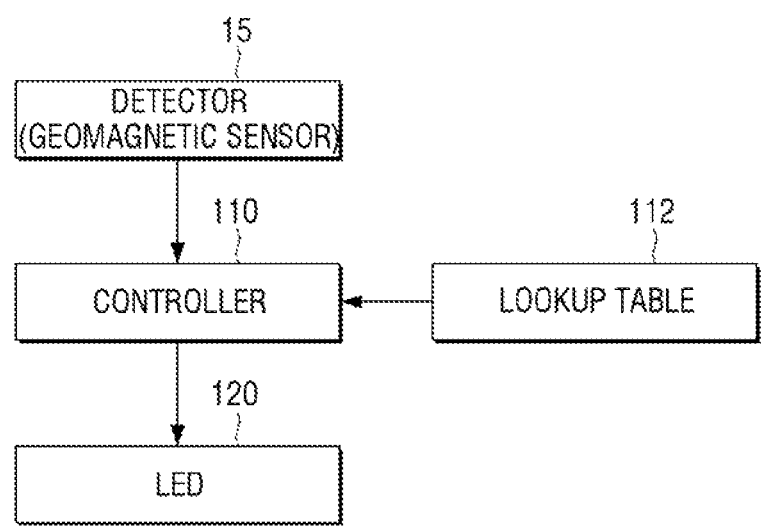
FIG. 11 is a functional block diagram illustrating a relationship between the jog dial and a controller in the washing machine of FIG. 9.

FIG. 9 is a view illustrating a washing machine to which a jog dial for an electronic device according to an embodiment of the present disclosure is applied, and FIG. 10 is an enlarged view illustrating a portion of the washing machine of FIG. 9 where the jog dial is disposed. FIG. 11 is a functional block diagram illustrating a relationship between the jog dial and a controller in the washing machine of FIG. 9.

Referring to FIG. 9, a jog dial 10 is provided on an operation panel of a washing machine 100 so that the user can select one of several washing courses. For example, as illustrated in FIG. 10, the washing machine 100 may be provided with washing courses such as boil, towels, futons, wool/lingerie, standard, a small amount, and bubble courses. Accordingly, the user may select one of the several washing courses with the jog dial 10 according to an embodiment of the present disclosure.

Hereinafter, the case of selecting the washing course by the jog dial 10 using the geomagnetic sensor will be described.

As illustrated in FIG. 10, the several washing courses are arranged at a predetermined interval around the dial knob 51 of the jog dial 10 of the washing machine 100, and each of the washing courses is provided with a light emitting diode (LED) 120 that lights up when the washing course is selected.

The jog dial 10 is formed in the same manner as the jog dial 10 illustrated in FIGS. 2a to 2c. In other words, a permanent magnet 12 is provided on the lower surface of the dial knob 11 and a circuit board 17 provided with a geomagnetic sensor 15 serving as a detector is provided below the operation panel 19 in which the dial knob 11 is disposed (see FIG. 2b). Here, the circuit board 17 may include a controller 110 that controls the washing machine 100 to perform various washing courses.

When the user turns the dial knob 13 of the jog dial 10, the position of the permanent magnet 12 changes, and the geomagnetic sensor 15 recognizes the changing position of the permanent magnet 12 and outputs a signal relating to the position of the permanent magnet 12.

The controller 110 of the circuit board 17 connected to the geomagnetic sensor 15 identifies the position of the permanent magnet 12 using the signal output from the geomagnetic sensor 35. For example, when the geomagnetic sensor 15 outputs pulses of the X, Y, and Z directions with respect to a change in the position of the permanent magnet 12, the controller 110 may identify the position of the permanent magnet 12 by counting the pulses output from the geomagnetic sensor 15.

A lookup table 132 in which the relationship between the positions of the permanent magnet 12 of the dial knob 11 and the washing courses is recorded may be stored in the controller 110. For example, in the lookup table 112, the relationship between the washing courses and the positions of the permanent magnet 12 in the XY coordinate system with the rotation center C of the dial knob 11 as the origin may be recorded. That is, the coordinates of the permanent magnet 12 when the permanent magnet 12 is positioned on the straight line L connecting an LED 120 that is illuminated as the washing course is selected and the rotation center C of the dial knob 11 may be matched with a washing course. For example, when the permanent magnet 12 is positioned on the straight line L connecting the LED 120-1 representing the standard washing course and the rotation center C of the dial knob 11 in FIG. 10, if the coordinates of the permanent magnet 12 are (a, b), the coordinates (a, b) may be matched with the standard washing course. Therefore, the washing machine 106 having seven washing courses as illustrated in FIG. 10 may be provided with the lookup table 112 in which seven coordinates and seven washing courses are matched.

The controller 110 identifies the position of the permanent magnet 12 using the output signal of the geomagnetic sensor 15. When the position of the permanent magnet 12 is matched with the coordinates of the permanent magnet 12 recorded in the lookup table 112, the controller 110 turns on the LED 120 of the washing course corresponding to the coordinates. For example, when the permanent magnet 12 of the dial knob 11 is positioned on the straight line L connecting the LED 120-1 of the standard washing course and the rotation center C of the dial knob 11, the controller 110 determines that the permanent magnet 12 is at the coordinates (a, b) from the output signal of the geomagnetic sensor 15, turns on the LED 120-1 representing the standard washing course, and recognizes that the standard washing course is selected by the user.

Thereafter, when the user presses a wash start button (not illustrated), the controller 110 controls the washing machine 100 to perform washing with the standard washing course selected by the jog dial 10.

In the above-described jog dial 10, the geomagnetic sensor 15 is used as the detector, and the permanent magnet 12 is used as the body to be detected. However, in the case of the jog dial 50 according to another embodiment of the present disclosure in which the NFC reader 55 is used as the detector and the NFC tags 52 are used as the body to be detected, the operation of selecting the washing course is the same as described above. However, the detector that provides the information received by the controller 110 is different as the geomagnetic sensor 15 and the NFC reader 55. In the case of using the NFC reader 55, there are restrictions on the number of NFC tags 52 that are the reference for identifying the position and the number of washing courses to be selected. That is, the number of NFC tags 52 is greater than the number of washing courses to be selected. Therefore, when there are seven washing courses as illustrated in FIG. 10, the number of NFC tags 52 may be eight or more.

In the above description, the washing machine 100 has been described as an example of the electronic device to which the jog dials 10 and 50 according to an embodiment of the present disclosure are applied. However, the electronic device to which the jog dials 10 and 50 according to the present disclosure are applied is not limited thereto. The jog dials 10 and 50 according to the present disclosure may be applied to electronic devices using the conventional jog dial like a microwave oven.

Figure 12:
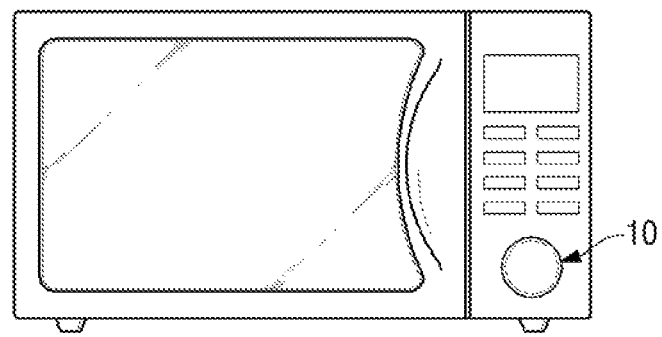
FIG. 12 is a view illustrating a microwave oven to which a jog dial for an electronic device according to an embodiment of the present disclosure is applied.

FIG. 12 is a view illustrating a microwave oven to which a jog dial for an electronic device according to an embodiment of the present disclosure is applied. In FIG. 12, the jog dial 10 may be used as a manual dial for the microwave oven 200.

As described above, in the jog dial according to an embodiment of the present disclosure, since the rotating dial knob and the detector for detecting the body to be detected provided on the dial knob are separated from each other without being mechanically connected, a failure due to mechanical coupling may be minimized and damage of the circuit board due to moisture penetration may be prevented.

The present disclosure has been described above in an illustrative manner. The terms used herein are for the purpose of description and should not be construed as limiting.

Various modification and variations of she present disclosure are possible in light of the above teachings. Therefore, unless otherwise indicated, the present disclosure may be embodied within the scope of the claims.

The invention claimed is:

1. A jog dial for an electronic device used in an electronic device with an operation panel, the jog dial comprising:
   a dial knob rotatably disposed in an upper surface of the operation panel;
   a body to be detected provided with the dial knob; and
   a detector disposed below the operation panel and configured to identify the body to be detected and output a signal,
   wherein the dial knob and the detector are separated from each other,
   wherein the body to be detected includes a permanent magnet, and the detector includes a geomagnetic sensor, and
   wherein the geomagnetic sensor is disposed below a rotation center of the dial knob, and the permanent magnet is disposed at a position eccentric from the rotation center of the dial knob.

2. The jog dial for an electronic device of claim 1, wherein the operation panel is provided with a rotation protrusion, and the dial knob is provided with a rotation groove into which the rotation protrusion is inserted, and
   wherein when the rotation protrusion of the operation panel is inserted into the rotation groove of the dial knob, the dial knob is rotatable with respect to the operation panel.

3. The jog dial for an electronic device of claim 1, wherein the operation panel is provided with a rotation groove, and a lower surface of the dial knob is provided with a rotation protrusion which is inserted into the rotation groove, and
   wherein when the rotation protrusion of the dial knob is inserted into the rotation groove of the operation panel, the dial knob is rotatable with respect to the operation panel.

4. The jog dial for an electronic device of claim 1, wherein the operation panel is provided with a dial groove into which the dial knob is inserted, and the dial knob is rotatably disposed in the dial groove.

5. The jog dial for an electronic device of claim 1, wherein the dial knob is formed in a ring shape, and the operation panel is provided with an annular groove into which the dial knob of the ring shape is inserted, and
   wherein the dial knob of the ring shape is rotatably disposed in the annular groove.

6. The jog dial for an electronic device of claim 5, wherein a display is provided in a central portion of the annular groove of the operation panel.

7. The jog dial for an electronic device of claim 1, wherein the dial knob is formed in a ring shape, and a circular support portion which is inserted into the dial knob of the ring shape protrudes from the operation panel, and
   wherein the dial knob of the ring shape is rotatably supported by the circular support portion.

8. The jog dial for an electronic device of claim 7, wherein a display is provided in the circular support portion of the operation panel.

9. An electronic device, comprising:
   a case for the electronic device;
   an operation panel provided in the case;
   a dial knob rotatably disposed in a upper surface of the operation panel;
   a body to be detected disposed in the dial knob;
   a circuit board disposed below the operation panel and provided with a detector that identifies the body to be detected and outputs a signal; and
   a controller disposed in the circuit board, and configured to control the electronic device using the signal of the detector,
   wherein the dial knob and the detector are separated from each other and the operation panel is interposed between the dial knob and the detector,
   wherein the body to be detected includes a permanent magnet, and the detector includes a geomagnetic sensor, and
   wherein the geomagnetic sensor is disposed below a rotation center of the dial knob, and the permanent magnet is disposed at a position eccentric from the rotation center of the dial knob.

10. The electronic device of claim 9, wherein the controller comprises a lookup table defining positions of the body to be detected and operations of the electronic device.

* * * * *